United States Patent
Remond et al.

(12) 
(10) Patent No.: US 6,625,995 B2
(45) Date of Patent: Sep. 30, 2003

(54) DEVICE FOR DETECTING A RISK OF MISTING OF A MOTOR-VEHICLE WINDOW, AND INSTALLATION INCLUDING SUCH A DEVICE

(75) Inventors: Bernard Remond, Cesson (FR); Michel Schwob, Chatou (FR); Atallah Benalia, Romainville (FR)

(73) Assignee: Valeo Electronique, Creteil (FR)

( * ) Notice: Subject to any disclaimer, the term of this patent is extended or adjusted under 35 U.S.C. 154(b) by 59 days.

(21) Appl. No.: 09/799,102

(22) Filed: Mar. 6, 2001

(65) Prior Publication Data

US 2001/0032470 A1 Oct. 25, 2001

(30) Foreign Application Priority Data

Mar. 7, 2000 (FR) .............................................. 00 02918

(51) Int. Cl.[7] .................................................. B60H 1/00
(52) U.S. Cl. ....................... 62/133; 62/176.6; 236/91 C
(58) Field of Search .......................... 62/133, 179, 180, 62/186, 229, 203, 208, 209, 176.1, 176.2, 176.5, 176.6; 236/44 R, 44 A, 44 C, 91 R, 91 C, 91 E, 91 F

(56) References Cited

U.S. PATENT DOCUMENTS

| | | | |
|---|---|---|---|
| 4,852,363 A | 8/1989 | Kampf et al. | ............... 62/176.6 |
| 5,579,994 A | * 12/1996 | Davis, Jr. et al. | .......... 236/91 C |

FOREIGN PATENT DOCUMENTS

| | | |
|---|---|---|
| DE | 3836559 | 5/1990 |
| DE | 19540566 | 6/1996 |
| DE | 19722577 | 12/1998 |

OTHER PUBLICATIONS

Patent Abstracts of Japan, Pub. No. 61110613, Pub. Date May 28, 1986.
Patent Abstracts of Japan, Pub. No. 60248422, Pub. Date Dec. 9, 1985.

* cited by examiner

Primary Examiner—Harry B. Tanner
(74) Attorney, Agent, or Firm—Liniak, Berenato & White

(57) ABSTRACT

Device for detecting a risk of misting of a motor-vehicle window, and installation including such a device. Measurements are taken and associated with chosen models giving access to an average temperature (on the surface) of the window, for instance the windscreen, and to a dew temperature of the air in the passenger compartment of the vehicle. A comparison between the two temperatures represents a risk of misting of the window.

12 Claims, 3 Drawing Sheets

DEVICE FOR DETECTING A RISK OF MISTING OF A MOTOR-VEHICLE WINDOW, AND INSTALLATION INCLUDING SUCH A DEVICE

FIELD OF THE INVENTION

The invention relates to a device for detecting the presence of misting on a motor-vehicle window. A window of this type, such as the windscreen of the vehicle, is interposed between the outside and the passenger compartment of the vehicle.

BACKGROUND OF THE INVENTION

A device for such detection generally comprises at least one input suitable for receiving information relating to a state of misting of the windscreen, as well as an output linked to a control module of an installation for heating, ventilating and/or air conditioning the passenger compartment of the vehicle. The control module issues a set-point value, as appropriate, for ventilating the windscreen, on the basis of the abovementioned information.

Known devices of this type usually include an optical measurement of the reflection of a beam on one face of the windscreen, on the passenger compartment side, in order to detect that it is misting up.

However, the beam illuminates only a localized region of the windscreen and it remains possible for a different region to be misted. Furthermore, it is often the case that stray light disturbs such optical measurements.

In the published European patent application EP 0718165, an interesting solution is proposed consisting in providing a device equipped with a dew-point sensor on the windscreen of the vehicle, or else a temperature probe accompanied by a humidity probe. However, such sensors are expensive and aggravate the cost of the detection.

The present invention aims to improve the situation.

SUMMARY OF THE INVENTION

According to one aspect of the invention there is provided a device for detecting a risk of misting being present on a motor-vehicle window, the said window being interposed between the outside and the passenger compartment of the vehicle, the device comprising:

at least a first and a second input for receiving at least first and second information, relating respectively to a temperature of the window and to a dew temperature in the passenger compartment of the vehicle,
  a calculating module suitable for:
    a) estimating a temperature of the window from at least the first information,
    b) estimating a dew temperature in the passenger compartment of the vehicle from at least the second information, and
    c) estimating a comparison between the temperature of the window and the dew temperature in order to deduce therefrom a risk of misting being present on the window,
  as well as an output suitable for delivering a signal relating to a risk of misting being present.

The comparison between the temperature of the window and the dew temperature may be represented by a difference between these two temperatures, or else by a ratio between these temperatures.

According to one advantageous characteristic of the invention, the device further includes a memory configured to store dew-temperature values associated, according to a Mollier diagram, with predetermined humidity values. The calculating module is then configured to work with this memory with a view to estimating the dew temperature on the basis of a relative-humidity budget. This characteristic offers the advantage of dispensing with a dew-temperature sensor, which is particularly expensive and of relative reliability.

In one variant, the calculating module may be configured to estimate the dew temperature as a function of a humidity value, according to a predetermined equation. As in the preceding variant, this humidity value is preferably deduced from a relative-humidity budget.

In one preferred embodiment, the second input is suitable for being connected to a temperature sensor of a cold-air source of the installation. In practice, this cold-air source is formed by an evaporator of an air-conditioning loop which the installation includes. In the abovementioned relative-humidity budget, it is considered that the air leaving the evaporator is substantially saturated with humidity and can thus give access to the dew temperature. The calculating module is then configured to evaluate the dew temperature on the basis of information relating to this temperature of the cold-air source. Initially, the air of the passenger compartment is preferably considered to be saturated with humidity. Such an implementation advantageously makes it possible to reduce the risks of misting, at the cost of needlessly triggering ventilation of the windscreen (or of other windows of the vehicle).

In one developed embodiment, the relative-humidity budget takes account, moreover, of an initial temperature in the passenger compartment and a throughput of air blown into the passenger compartment. Advantageously, the device further includes inputs suitable for receiving information relating to a temperature in the passenger compartment and to a throughput of air blown into the passenger compartment.

In one further improved embodiment, the device further includes an input suitable for receiving information relating to humidity given off by the passengers of the passenger compartment, while the relative-humidity budget moreover takes account of average humidity, given off by the passengers. In practice, indicators of the presence of passengers could be provided, such as sensors in the seats of the passenger compartment or infrared sensors.

Advantageously, the abovementioned memory includes data relating to a predetermined value of a total volume of air in the passenger compartment, appearing in the abovementioned relative-humidity budget.

In one embodiment according to which the installation includes a device for recirculating air in the passenger compartment, the device according to the invention advantageously includes an input suitable for being connected to an actuator for adjusting the position of a recirculation flap, while the calculating module is configured to distinguish, in the relative-humidity budget, humidity of outside air blown into the passenger compartment and humidity of air recirculated in the passenger compartment, depending on the position of the recirculation flap.

As far as the estimating of the temperature of the window is concerned, the device according to the invention advantageously includes a plurality of inputs suitable for receiving information relating to a temperature and a speed of blown air, to an average temperature in the passenger compartment, to the speed of the vehicle and to an outside-air temperature.

In the French patent application FR-9806831 by the Applicant, a device is described which is capable of estimating a temperature of air blown into any region of the passenger compartment of a motor vehicle, solely on the basis of information relating to a temperature and a speed of air blown by the aeration vents of the passenger compartment, to an average temperature in the passenger compartment, to the speed of the vehicle and to an outside-air temperature. More particularly, the temperatures and speed of blown air can be deduced from a control of the actuators for setting a hot-air source and/or a cold-air source (for the temperature) and from a blower (for the speed) which the installation for heating, ventilating and/or air-conditioning the passenger compartment of the vehicle comprises. Such a control offers a saving on temperature and airspeed sensors.

As to the information relating to an average temperature in the passenger compartment, to the speed of the vehicle and to an outside-air temperature, these can be deduced from measurements by sensors currently used in the motor-vehicle field, and already serve, at least partly, to establish the abovementioned relative-humidity budget.

Thus, the use by the device according to the invention of the technique described in the application FR-9806831 advantageously makes it possible to estimate a (spatially) average temperature of the window, while saving on a plurality of temperature sensors, arranged at respective regions of the window and necessary for determining this average temperature.

The calculating module is then configured to estimate the temperature of the window on the basis of the temperature and of the speed of air blown onto the window, of the average temperature in the passenger compartment, of the speed of the vehicle and of the outside-air temperature.

In one developed embodiment, the device further includes an input suitable for being connected to a solar-flux sensor, and the calculating module is configured to estimate the temperature of the window by taking account of insolation of the window.

According to an advantageous characteristic of the invention, the output of the detection device is suitable for being connected to a module for control of an installation for heating, ventilating and/or air-conditioning the passenger compartment of the vehicle, in order to deliver a set-point value relating to a risk of misting being present.

In this respect in a second aspect, the invention provides installation for heating, ventilating and/or air conditioning the passenger compartment of a motor vehicle, the installation comprising a module for control of at least one item of equipment of the installation, configured to work with a device for detecting a risk of misting being present on a motor-vehicle window, the said window being interposed between the outside and the passenger compartment of the vehicle, the device comprising:

at least a first and a second input for receiving at least first and second information, relating respectively to a temperature of the window and to a dew temperature in the passenger compartment of the vehicle, a calculating module suitable for:
a) estimating a temperature of the window from at least the first information,
b) estimating a dew temperature in the passenger compartment of the vehicle from at least the second information, and
c) estimating a comparison between the temperature of the window and the dew temperature in order to deduce therefrom a risk of misting being present on the window, as well as an output suitable for delivering a signal relating to a risk of misting being present.

Such an installation advantageously includes a device for ventilating the window. The control module is then configured to work with the detection device, with a view to delivering a set-point value for ventilation of the window when the estimated difference between the temperature of the window and the dew temperature (which are associated with humidity values) is below a first threshold value.

In one more advanced variant, the installation includes a device for air conditioning the passenger compartment. The control module is then configured to work with the detection device, with a view to delivering a set-point value for air conditioning the passenger compartment when the estimated difference between the temperature of the window and the dew temperature is below a second threshold value.

Advantageously, the installation includes a device for heating the air blown onto the window. The control module is then configured to work with the detection device, with a view to delivering a set-point value for heating the air blown onto the window when the estimated difference between the temperature of the window and the dew temperature is below a third threshold value.

Advantageously, the installation further includes a device for recirculating air in the passenger compartment. The control module is then configured to work with the detection device, with a view to delivering a set-point value for letting outside air into the passenger compartment when the estimated difference between the temperature of the window and the dew temperature is below a fourth threshold value.

In a preferred embodiment, the installation includes an air-conditioning loop comprising an evaporator, as well as a temperature sensor, arranged in proximity to the evaporator and downstream of it in the direction of travel of an air flow intended to be blown into the passenger compartment. This sensor is suitable for being connected to the abovementioned second input of the detection device.

Thus, the detection device according to the invention advantageously needs no supplementary sensors by comparison with a conventional heating, ventilation and/or air-conditioning installation.

BRIEF DESCRIPTION OF THE DRAWINGS

Other characteristics and advantages of the invention will emerge on examining the detailed description below, and the attached drawings, in which.

DESCRIPTION OF THE PREFERRED EMBODIMENT

Figure 1:
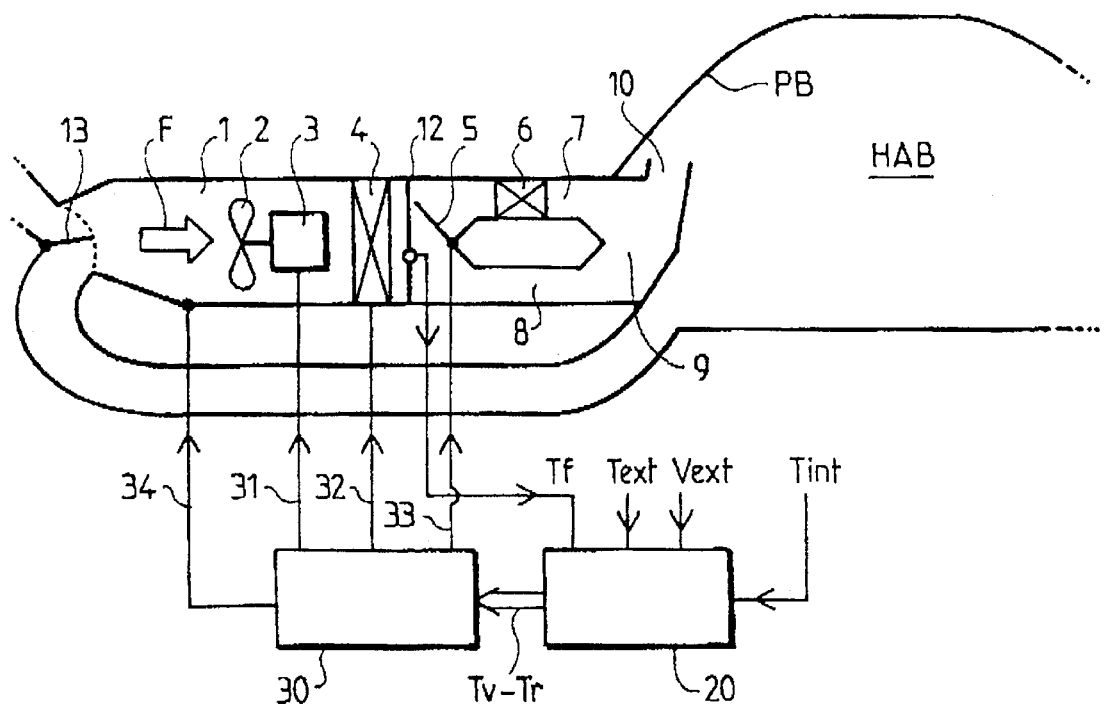
FIG. 1 diagrammatically represents an installation for heating, ventilating and air conditioning the passenger compartment HAB of a motor vehicle, equipped with a device for detecting a risk of misting of the windscreen PB of this vehicle, according to the invention.

In the various figures, like reference numerals refer to like parts.

The attached drawings and the detailed description below contain, in essence, elements of a certain character. They could not only serve to give a better understanding of the present invention, but also contribute to its definition, as the case may be.

Referring first of all to FIG. 1, an installation is described for heating, ventilating and air conditioning the passenger compartment HAB of a motor vehicle, comprising a device according to the invention for detecting a risk of the presence of misting on a window of the vehicle, in particular on the windscreen PB.

This installation comprises a blower equipped with a motor 3 suitable for turning the blades of a fan 2, with a view to producing an air flow F in a main duct 1, which houses the evaporator 4 of an air-conditioning loop (pressure-reducing valve, evaporator, compressor, condenser) which the installation includes.

In the example described, the main duct 1 is separated, downstream of the evaporator 4, into a cold-air branch 8 and a hot-air branch 7 which join together in a mixing chamber 9, communicating with ducts 10 for ventilating the passenger compartment. The hot-air branch 7 comprises a heating radiator 6, while a mixing flap 5 is provided, upstream of the hot-air 7 and cold-air 8 branches, in order to share out an airflow into one and/or the other of these branches, with a view to obtaining, in the mixing chamber 9, an airflow at a temperature adjusted as a function of the position of the mixing flap 5.

In one variant of the installation described, provision can be made, in the main duct 1, for a heating radiator equipped with a valve for control of the throughput of heat-exchange fluid which passes through it (for example water, in the case of water-heating radiators). This valve can be controlled by the module 30, with a view to adjusting the temperature of the airflow leaving this heating radiator and, that being so, the temperature of the airflow blown into the passenger compartment. Such a heating radiator with a control valve would replace the mixing flap 5, the hot-air branch 7 equipped with its radiator 6, the cold-air branch 8, as well as the mixing chamber 9.

The installation includes, in particular, a duct 10 for ventilating the windscreen PB of the vehicle, in order to demist it.

A recirculation device further comprises a recirculation flap 13 for letting outside air or recirculated air into the main duct 1. In practice, when the recirculation flap 13 lets in the outside air, the passenger compartment of the vehicle is ventilated with outside air. On the other hand, when the recirculation flap is in a position according to which the main duct 1 lets in only recirculated air, recirculated air is blown into the passenger compartment of the vehicle.

The installation comprises a module 30 for control of the various items of equipment which it includes. Thus, the link 31 makes it possible to adjust the rotational speed of the motor 3 which the blower of the installation includes, with a view to setting the speed of the airflow blown into the passenger compartment. The link 32 makes it possible to alter the throughput of cooling fluid which flows in the air-conditioning loop, with a view to adjusting the reduction in temperature which the airflow F undergoes, when it passes through the evaporator 4. The link 32 makes it possible to alter the position of the mixing flap 5, with a view to adjusting the temperature of the airflow in the mixing chamber 9. The link 34 makes it possible to control the admission of outside air or of recirculated air into the passenger compartment.

The installation includes a device for detecting a risk of the presence of misting on the windscreen PB of the motor vehicle. This device is configured, according to the invention, to estimate a difference between the average temperature of the windscreen $T_v$ (average on its surface) and the dew temperature in the passenger compartment $T_r$. To that end, the detection device 20 comprises a plurality of inputs for receiving data relating to parameters such as the temperature outside the vehicle $T_{ext}$, the speed of the vehicle $V_{ext}$, the temperature $T_f$ of the airflow leaving the evaporator 4 and an average temperature in the passenger compartment $T_{int}$. A calculating module of the device 20 is then configured, in the example described, to estimate the difference $T_v - T_r$.

Referring to FIG. 1, practically all of the airflow produced by the blower of the installation passes through the evaporator 4 of the air-conditioning loop. The heat exchange within the evaporator 4 thus tends to saturate the airflow F with water vapor.

In the example described, it is thus estimated that the airflow F, leaving the evaporator 4, is saturated with humidity. The measurement of its temperature can thus give access to the dew temperature of the air which will be blown into the passenger compartment. That end, a temperature sensor 12 is provided in order to measure the temperature $T_f$ just downstream of the evaporator 4.

Figure 2:
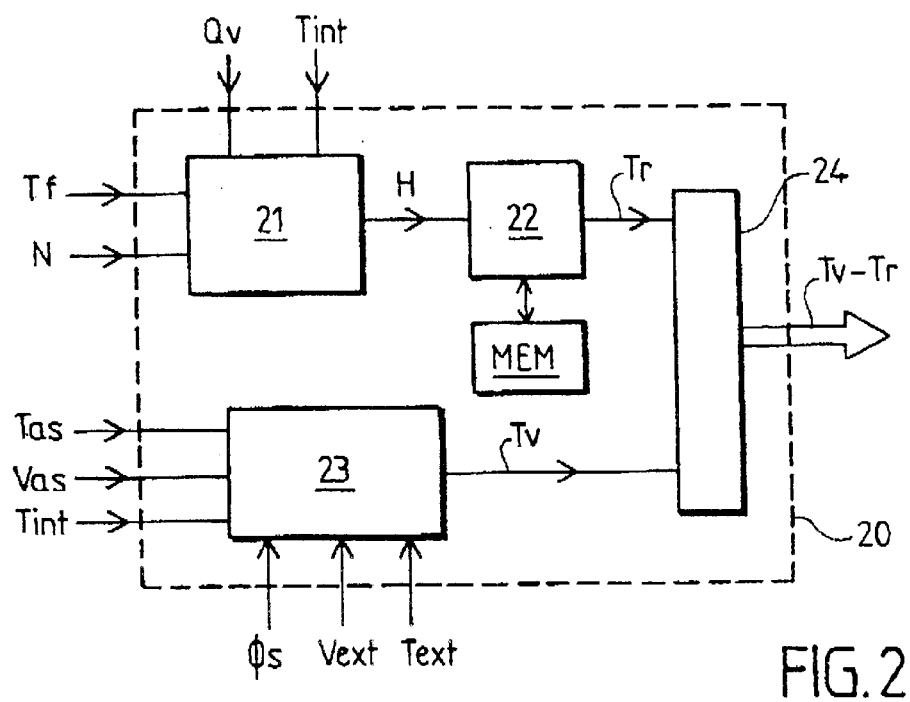
FIG. 2 diagrammatically represents the structure of a device according to the invention, with inputs for receiving information relating to chosen thermal parameters, and an output for delivering a set-point value representative of the difference between the dew temperature in the passenger compartment and a temperature of the windscreen PB.

Referring to FIG. 2, the detection device 20 comprises a first set of inputs for receiving information respectively relating to:

the temperature $T_f$ of the cold-air source 4 (temperature of the airflow F leaving the evaporator);

the air throughput blown into the passenger compartment $q_v$;

the initial, average, temperature in the passenger compartment $T_{int}$; and the number of passengers N on board in the passenger compartment, as appropriate.

For estimating the throughput of air blown into the passenger compartment $q_v$, communication is provided for between the device 20 and the blower of the installation, in the form of an interrogation/response. In this case, the module 20 sends an interrogation signal to the motor 3 of the blower, or else to the control module 30, and receives back information relating to the rotational speed of the blower, and, that being so, an estimate of the throughput of blown air $q_v$, taking account especially of the speed of the vehicle.

The average temperature $T_{int}$ in the passenger compartment can be estimated from a sensor in the passenger compartment, known per se.

In the case in which information relating to the number of passengers is used, passenger-presence sensors can be provided in the passenger compartment of the vehicle. These sensors can be arranged in the seats of the passenger compartment (weight sensors), or infrared sensors, or else on the basis of information derived from the opening or from the closing of the doors of the vehicle.

It should be noted that these various pieces of information can be obtained by direct sensors. Hence, the throughput of blown air $q_v$ can also be measured on the basis of anemometer-type sensors, placed at the output of the aeration vents of the passenger compartment and/or in the air-conditioning apparatus.

In general, the humidity within the passenger compartment is managed by a humidity-budget equation, in differential form:

$$\rho_{air} V_{air} dH/dt = \rho_{air} (q_v H_v - q_v H) + N\Gamma \qquad (1)$$

in which:
- $q_v$ (m³/s) is the throughput of air blown into the passenger compartment,
- $\rho_{air}$ (kg/m³) is the density of the air,
- H is the absolute humidity of the air in the passenger compartment (kg of water/kg of dry air);
- $H_v$ is the absolute humidity contributed by the air ventilation in the passenger compartment;
- $V_{air}$ (m³) is the volume of air within the passenger compartment, corresponding to a predetermined value, stored in the memory MEM; and
- $\Gamma$ (kg of water/s/person) is the absolute humidity generated per second, on average, by a passenger in the passenger compartment.

Figure 3:
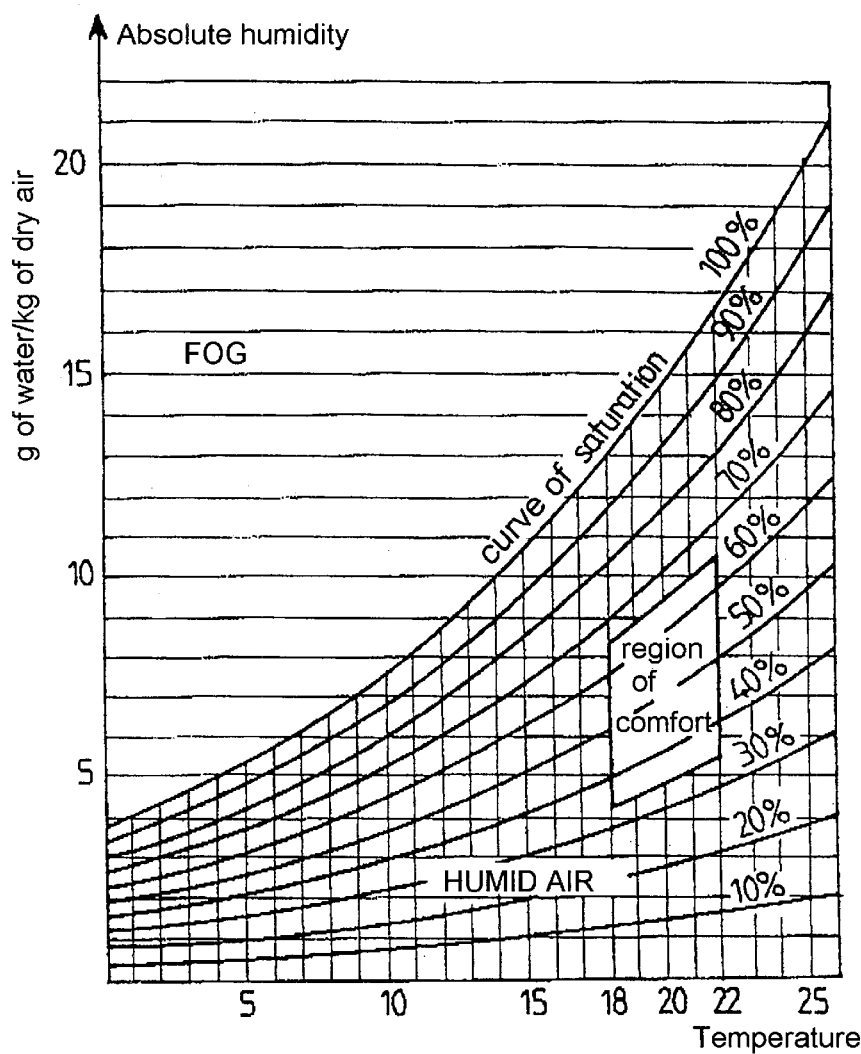
FIG. 3 represents a MOLLIER diagram, giving the absolute humidity of air at one atmosphere, as a function of temperature.

To solve the above differential equation, it is necessary to obtain an estimate of the initial humidity in the passenger compartment. The calculating module of the detection device is, in the example described, configured to consider that initially, the air in the passenger compartment is saturated with humidity. Thus, on the basis of the average initial temperature $T_{int}$ in the passenger compartment, and by making use of the MOLLIER diagram represented in FIG. 3, an initial value of the humidity in the passenger compartment is reached. To do that, a point is taken on the saturation curve CS (100%), the abscissa of which corresponds to the initial internal temperature in the passenger compartment, and the corresponding ordinate is found on this saturation curve. For example, if the temperature $T_{int}$ is close to 20° C., the initial humidity in the passenger compartment is considered to be close to 15 g of water/kg of dry air.

The detection device according to the invention advantageously comprises a memory MEM (FIG. 2) in which are stored the calculating instructions relating to equation (1). It further includes correspondence data, according to a MOLLIER diagram, between temperature and humidity, for an air pressure close to 1 atmosphere. In a variant, it may contain calculating instructions giving the temperature as a function of the humidity, on the basis of a predetermined equation.

In order to estimate the absolute humidity generated by the air ventilation in the passenger compartment, a sensor of relative-humidity type can be provided directly, placed at the output of an aeration vent of the apparatus. In one preferred embodiment of the present invention, this absolute humidity $H_v$ is estimated by a model using information relating to the blown-air throughput $q_v$ and to the temperature of the cold source $T_f$ (leaving the evaporator 4).

Figure 4:
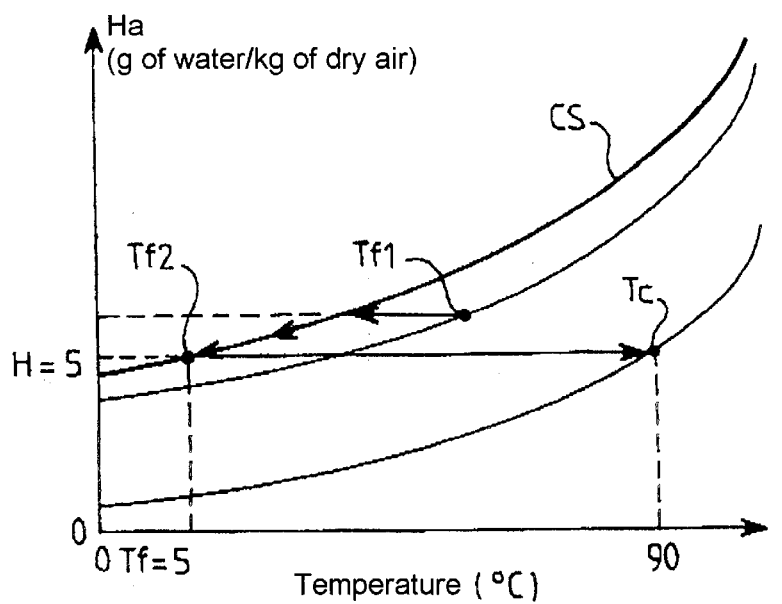
FIG. 4 represents such a MOLLIER diagram applied to the estimating of the dew temperature in the passenger compartment of the vehicle.

Referring to FIG. 4, the airflow F generated by the blower is of initial temperature $T_{f1}$. In passing through the evaporator 4, it is saturated with humidity and its temperature reduces down to the exit temperature $T_{f2}$ (corresponding to the temperature $T_f$ which the sensor 12 measures). In the case in which a portion of the airflow F passes through the hot-air branch and the heating radiator 6, its temperature increases but its absolute humidity does not change substantially.

It is thus considered, according to a pragmatic approximation, that the temperature $T_f$ at the outlet from the evaporator 4 corresponds to the dew temperature of the air blown into the passenger compartment. By using the correspondences given by the MOLLIER diagram (saturation curve CS), access is thus gained to the humidity of the air blown into the passenger compartment $H_v$, and the differential equation (1) can be integrated.

In the case in which the installation includes a device for recirculation of air in the passenger compartment, the misting-formation-risk detection device comprises a supplementary input for receiving information relating to the position of a recirculation flap. Thus, if the air blown into the passenger compartment is essentially recirculated air, it is estimated that the humidity of the air initially blown into the passenger compartment corresponds to the initial humidity in the passenger compartment (given by the average temperature $T_{int}$), in particular when the air conditioning is shut down. In contrast, when the position of the recirculation flap is such that the air blown into the passenger compartment is principally outside air, the humidity of the air blown into the passenger compartment is estimated as being at the humidity of the outside air (given by the temperature $T_f$ at the exit from the cold source), in particular when the air conditioning is shut down.

Referring to FIG. 2, a first calculating module 21 estimates the humidity H in the passenger compartment, on the basis of a relative-humidity budget involving the differential equation (1). In this relative-humidity budget, the initial humidity of the passenger compartment is given by the temperature $T_{int}$. The blown-air throughput $q_v$ is given by information relating to the rotational speed of the motor of the blower and by the speed of the vehicle. The temperature of the cold source $T_f$ gives access to the humidity of the air blown into the passenger compartment. If the humidity given off by the passengers is taken into account, the device 20 comprises an input for determining the number of passengers present in the passenger compartment and, from that, for deducing an estimate of the average humidity given off by the passengers of the passenger compartment (NΓ).

Thus, on the basis of the estimated humidity H in the passenger compartment, the device 20 is able to estimate a dew temperature in the passenger compartment, by using the memory MEM in which are stored, especially, the correspondences between dew temperature and humidity, a second calculating module 22 working with this memory MEM.

In the example described, the device 20 includes a third calculating module 23 which receives information relating to a temperature of air blown into the passenger compartment $T_{as}$, a blown-air speed $V_{as}$, the average temperature in the passenger compartment $T_{int}$, the outside-air temperature $T_{ext}$, the speed of the vehicle $V_{ext}$ and, if appropriate, information relating to a solar flux which the windscreen of the vehicle receives. On the basis of all this information, the second calculating module 23 is configured to estimate an average temperature of the windscreen of the vehicle $T_v$.

Figure 5:
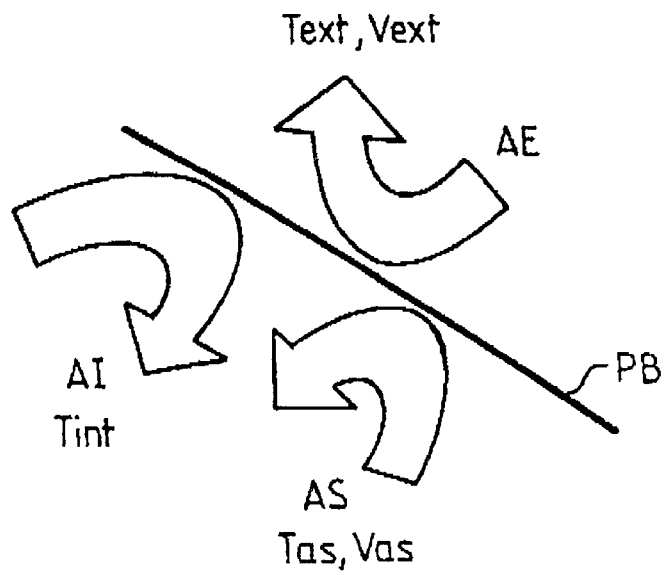
FIG. 5 diagrammatically represents the thermal exchanges between the various airflows received by the windscreen PB of the vehicle.

Referring to FIG. 5, this window PB of the vehicle is swept by the following airflows:
- an outside airflow AE, with temperature $T_{ext}$ and speed $V_{ext}$;
- a blown airflow AS, with temperature $T_{as}$ and speed $V_{as}$; and
- an interior airflow AI, with temperature $T_{int}$ and speed which may be ignored.

In the preferred embodiment described here, the temperature of the windscreen is estimated on the basis of an aerodynamic jet model, combined with a thermal model.

The thermal budget is governed by the following differential equation:

$$M_v C_v dT_v/dt = h_{int}(T_{int}-T_v) + h_{ext}(T_{ext}-T_v) \quad (2)$$

in which:

$M_v$ is the mass of the windscreen;

$C_v$ is the heat capacity of the windscreen;

$T_v$ is its temperature;

$h_{int}$, the coefficient of convection between the windscreen and the inside air; and $h_{ext}$, the coefficient of convection between the windscreen and the outside air.

These two convection coefficients $h_{int}$ and $h_{ext}$ are known functions of the interior temperature, of the outside temperature, of the temperature of the windscreen, of the blown-air throughput $q_v$ and of the speed of the outside air (or the speed of the motor vehicle, to a first approximation).

The integration of the differential equation relating to the thermal budget of the windscreen, on the basis of the parameters $T_{int}$, $T_{ext}$, $T_{as}$, $V_{ext}$ and $V_{as}$ is known from the application FR-98 06831 of the Applicant. Thus the average temperature of the windscreen (average on the surface) is found.

Hence, for estimating the temperature of the windscreen, the blown-air speed $V_{as}$ can be deduced from the rotational speed of the motor of the blower and from the position of the flaps for air distribution in the passenger compartment and from the speed of the vehicle (to a first approximation, this parameter corresponds to the blown-air throughput $q_v$);

the average temperature in the passenger compartment $T_{int}$ can be estimated on the basis of a model using a thermal budget, or else from an average-temperature sensor in the passenger compartment;

the outside temperature $T_{ext}$ can be measured on the basis of a sensor outside the vehicle, in a way which is known in itself;

the outside-air speed $V_{ext}$ is deduced from the speed of the vehicle; and the blown-air temperature $T_{as}$ can be deduced from an aerodynamic and thermal model of the apparatus, or else measured on the basis of a sensor in an aeration vent of the passenger compartment of the vehicle.

The solar flux $\Phi_S$ can be taken into account in the abovementioned thermal budget, as the heat contribution, and can be estimated on the basis of a solar-flux sensor, such as a photodiode or the like, arranged on the dashboard of the vehicle, for example.

Figure 6:
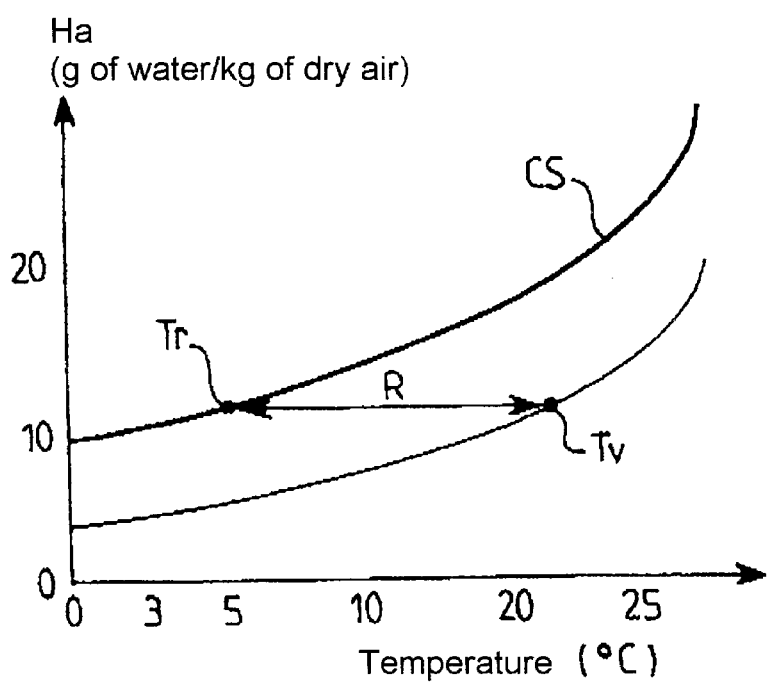
FIG. 6 represents a MOLLIER diagram, on which features a parameter R quantitatively representative of a risk of misting of the windscreen PB of the vehicle.

On the basis of the temperature of the windscreen $T_v$ and of the estimated dew temperature in the passenger compartment $T_r$, the device according to the invention evaluates the difference $T_v-T_r$. This temperature difference is quantitatively representative of a risk R (FIG. 6) of misting of the windscreen of the vehicle. Hence, if the temperature of the windscreen $T_v$ is less than or close to the dew temperature $T_r$, the risk of misting is significant and it is appropriate to trigger hot and dry air ventilation onto the windscreen. In contrast, when the temperature $T_v$ of the windscreen is markedly higher than the dew temperature $T_r$, the risk of misting is low and such ventilation of the windscreen is not necessary.

In the example described, the device according to the invention includes an output connected to the module 30 for control of the installation for heating, ventilating and air conditioning the passenger compartment of the vehicle, through which it delivers a set-point value relating to the risk of misting being present on the windscreen (at the output of the module 24 suitable for estimating the difference in temperature $T_v-T_r$). If this temperature difference is:

greater than 5° C. (abovementioned first threshold value) the control module does not send out any new set-point value relating to ventilation of the windscreen;

lying between 3° C. (corresponding, in the example described, to the second abovementioned threshold value) and 5° C., the control module 30 is configured to issue a set-point value to the blower in order to trigger ventilation of the windscreen;

close to 3° C., the control module is configured further to trigger air conditioning in the passenger compartment (control of the air-conditioning loop via the link 32);

lying between 2° C. (corresponding to the abovementioned fourth threshold value) and 3° C., the control module further triggers letting outside air into the passenger compartment if the installation includes a device for recirculating air in the passenger compartment;

less than 0° C. (corresponding to the abovementioned third threshold value), the control module further triggers an alteration of the position of the mixing flap in order to increase the temperature of the airflow blown into the passenger compartment.

Provision can be made for the detection of the risk of misting being present to be carried out upon the vehicle being started, and, if appropriate, at instants separated by a chosen duration, when the vehicle is in service.

Needless to say, the present invention is not limited to the embodiment described above by way of example. It extends to other variants.

Hence it will be understood that the various threshold values, in terms of temperature, of the difference $T_v-T_r$ are given above by way of example and can allow for variations. For example, in the case in which the installation does not include a device for recirculating air in the passenger compartment, provision can be made to heat the airflow blown into the passenger compartment as from a temperature difference close to 2° C.

In the example described above, the device according to the invention works with a control module of the installation, in such a way as automatically to trigger the ventilation of the windscreen if a risk is detected. In one less elaborate variant, provision can be made to give a signal, for example on the dashboard of the vehicle, in order to draw the attention of a passenger of the passenger compartment, who can then decide whether to trigger ventilation of the window manually, as appropriate.

In the example described above, a saving is made on a dew-temperature sensor in the passenger compartment of the vehicle, which is generally expensive. Needless to say, such a sensor can be used to measure the dew temperature directly, in one variant.

In this case, a memory containing correspondences between humidities, on the one hand, and temperatures, on the other hand, according to a MOLLIER diagram, is not necessary in the detection device.

Likewise, in the embodiment example described above, a saving is made on a network of temperature sensors mounted on the windscreen of the vehicle in order to estimate an average temperature thereof. In one variant of the device according to the invention, such a network of temperature sensors can be provided (arranged, for example, at regular steps along a horizontal direction and along a vertical direction).

In the above example, it is being considered that the air initially contained in the passenger compartment is saturated with humidity. In a variant, a device can be envisaged allowing a more precise determination of this humidity, for example by using the outside temperature $T_{ext}$.

The structure of the misting-risk detection device 20, represented in FIG. 2, is given by way of example. In practice, it includes a memory MEM for storing the above-mentioned correspondences extracted from a MOLLIER diagram, as well as a calculating module, typically a microprocessor which works with an associated memory, in order to make the estimates in terms of temperatures and in terms of differences in temperatures described above. Thus, such a calculating module groups together the modules 21, 22, 23 and 24 described above. In one advantageous embodiment, an on-board computer comprises such a microprocessor, as well as a read-only memory for storing the correspondences given by the MOLLIER diagram and a random-access memory for carrying out the processing operations necessary to obtain the temperature difference $T_v - T_r$.

In particular, the memory MEM further comprises a computer program comprising instruction lines for:

defining the variables relating to the parameters $T_{int}$, $T_{ext}$, $V_{ext}$, $q_v$, $T_f$, etc., relating these variables according to the differential equations (1) and (2), and solving these equations, while an end instruction gives the temperature difference $T_v - T_r$ (or else the ratio $T_v/T_r$)

In this context, such a computer program represents an advantageous means for implementing the invention. This program can be stored in memory of an on-board computer of a motor vehicle, or else on a different medium (diskette, CD-ROM, etc.) with a view to subsequent storage in a memory of an on-board computer of the abovementioned type.

What we claim is:

1. A device for detecting a risk of misting being present on a motor-vehicle window, the said window being interposed between the outside and the passenger compartment of the vehicle, the device comprising:

at least a first and a second input for receiving at least first and second information, relating respectively to a temperature of the window and to a dew temperature in the passenger compartment of the vehicle, a calculating module suitable for:
   a) estimating a temperature of the window from at least the first information,
   b) estimating a dew temperature in the passenger compartment of the vehicle from at least the second information, and
   c) estimating a comparison between the temperature of the window and the dew temperature in order to deduce therefrom a risk of misting being present on the window, as well as an output suitable for delivering a signal relating to a risk of misting being present, further comprising a memory configured to store dew-temperature values associated, according to a Mollier diagram, with predetermined humidity values, and wherein the calculating module is configured to work with the said memory with a view to estimating the dew temperature on the basis of a relative-humidity budget, and wherein the second input is suitable for being connected to a temperature sensor of a cold-air source of the installation, and wherein the calculating module is configured to evaluate the dew temperature of the passenger compartment on the basis of information representative of the temperature of the cold-air source, while the air of the passenger compartment is initially considered to be saturated with humidity.

2. The device of claim 1, wherein the said output is suitable for being connected to a control module (30) of an installation for heating, ventilating and/or air conditioning the passenger compartment of the vehicle, in order to deliver a set-point value relating to a risk (R) of misting being present.

3. The device of claim 1, and further comprising a memory configured to store calculating instructions able, according to a predetermined equation, to give dew-temperature values as a function of predetermined humidity values, and wherein the calculating module is configured to work with the said memory with a view to estimating the dew temperature on the basis of a relative-humidity budget.

4. The device of claim 3, wherein the second input is suitable for being connected to a temperature sensor of a cold-air source of the installation, and wherein the calculating module is configured to evaluate the dew temperature of the passenger compartment on the basis of information representative of the temperature of the cold-air source, while the air of the passenger compartment is initially considered to be saturated with humidity.

5. The device of claim 1, and further comprising inputs suitable for receiving information relating to a temperature in the passenger compartment and to a throughput of air blown into the passenger compartment, while the relative-humidity budget furthermore involves the temperature of the passenger compartment and the said throughput.

6. The device of claim 4, and further comprising inputs suitable for receiving information relating to a temperature in the passenger compartment and to a throughput of air blown into the passenger compartment, while the relative-humidity budget furthermore involves the temperature of the passenger compartment and the said throughput.

7. Device according to claim 5, and further comprising an input suitable for receiving information relating to humidity given off by the passengers of the passenger compartment, while the relative-humidity budget moreover takes account of humidity given off by the passengers.

8. Device according to claim 6, and further comprising an input suitable for receiving information relating to humidity given off by the passengers of the passenger compartment, while the relative-humidity budget moreover takes account of humidity given off by the passengers.

9. The device of claim 1, wherein the said memory (MEM) includes predetermined data relating to a volume of air ($V_{air}$) in the passenger compartment.

10. The device of claim 1, and comprising an input suitable for being connected to an actuator for adjusting the position of a flap for recirculating air within the passenger compartment, which the installation includes, while the calculating module is configured to distinguish, in the relative-humidity budget, humidity of outside air blown into the passenger compartment from humidity of air recirculated in the passenger compartment, depending on the position of the recirculation flap.

11. The device of claim 1, and comprising a plurality of inputs suitable for receiving information relating to a temperature and a speed of blown air, to an average temperature in the passenger compartment, to the speed of the vehicle and to an outside-air temperature, and in that the calculating module is configured to estimate the temperature of the window on the basis of the temperature and of the speed of air blown onto the window, of the average temperature in the passenger compartment, of the speed of the vehicle and of the outside-air temperature.

12. The device of claim 11, and further comprising an input suitable for being connected to a solar-flux sensor, and wherein the calculating module is configured to estimate the temperature of the window by taking account of insolation of the said window.

* * * * *